US011408592B2

(12) United States Patent
Owens et al.

(10) Patent No.: US 11,408,592 B2
(45) Date of Patent: Aug. 9, 2022

(54) INTEGRATED LOUVRES FOR BEAM CONTROL IN AN LED LIGHTING DEVICE

(71) Applicant: SIGNIFY HOLDING B.V., Eindhoven (NL)

(72) Inventors: Walten Peter Owens, Chittenango, NY (US); Benjamin David Vollmer, Manlius, NY (US); Kevin C. Broughton, Sharpsburg, GA (US); Michael Quijano, Manlius, NY (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/536,810

(22) Filed: Aug. 9, 2019

(65) Prior Publication Data

US 2020/0049325 A1     Feb. 13, 2020

Related U.S. Application Data

(60) Provisional application No. 62/717,168, filed on Aug. 10, 2018.

(51) Int. Cl.
*F21V 13/10* (2006.01)
*F21V 7/06* (2006.01)
*F21V 11/18* (2006.01)
*F21Y 105/18* (2016.01)
*F21Y 115/10* (2016.01)
(Continued)

(52) U.S. Cl.
CPC ............... *F21V 13/10* (2013.01); *F21V 7/06* (2013.01); *F21V 11/04* (2013.01); *F21V 11/183* (2013.01); *F21W 2131/105* (2013.01); *F21Y 2105/18* (2016.08); *F21Y 2115/10* (2016.08)

(58) Field of Classification Search
CPC .......... F21V 13/10; F21V 7/06; F21V 7/0025; F21V 7/0083; F21V 11/183; F21V 11/04; F21V 14/08; F21V 17/10; F21V 7/0091; F21V 11/16; F21V 11/18; F21V 11/186; F21Y 2105/00; F21Y 2105/18; F21Y 2105/12; F21Y 2105/10; F21Y 2115/10; F21S 10/026; F21W 2131/105
See application file for complete search history.

(56) References Cited

U.S. PATENT DOCUMENTS 1,397,803 A * 11/1921 Ensor .................. B60Q 1/1438
                                                                362/283
2,142,467 A *  1/1939 Waterbury ................ F21V 7/09
                                                                362/297
(Continued)

FOREIGN PATENT DOCUMENTS

CA           228920 A       2/1923
CN       204227117 U   *  3/2015    ............ F21V 7/0083
(Continued)

*Primary Examiner* — Erin Kryukova

(57) ABSTRACT

An optical structure for controlling distribution of light generated by a light source is described. The optical structure includes a primary optics disposed relative to the light source and configured to reflect light generated by the light source towards a target region. The optical structure also includes a secondary optics disposed and aligned relative to the primary optics. The secondary optics is configured to at least partially block light generated by the light source from illuminating a region outside the target region.

16 Claims, 17 Drawing Sheets

(51) Int. Cl.
*F21W 131/105* (2006.01)
*F21V 11/04* (2006.01)

(56) References Cited

U.S. PATENT DOCUMENTS

| | | | | |
|---|---|---|---|---|
| 2,518,505 | A * | 8/1950 | Teele, Jr. | F21V 14/08 362/343 |
| 3,860,903 | A * | 1/1975 | Van Steenhoven | F21V 11/04 362/279 |
| 4,816,974 | A * | 3/1989 | Gordin | F21V 7/0025 313/114 |
| 5,400,223 | A * | 3/1995 | Speaker | F21V 25/04 362/21 |
| 5,730,521 | A * | 3/1998 | Spink | F21V 21/30 362/223 |
| 5,938,317 | A * | 8/1999 | Thornton | F21V 11/02 362/235 |
| 6,190,023 | B1 * | 2/2001 | Leadford | F21V 5/02 362/303 |
| 6,502,965 | B1 * | 1/2003 | Bradford | F21S 8/026 362/147 |
| 10,584,855 | B1 * | 3/2020 | Drost | F21V 21/30 |
| 2003/0026102 | A1 * | 2/2003 | Galia | F21V 11/02 362/290 |
| 2007/0115655 | A1 * | 5/2007 | Kaminski | F21V 7/04 362/227 |
| 2008/0273335 | A1 * | 11/2008 | Gordin | F21S 8/086 362/296.07 |
| 2009/0262532 | A1 * | 10/2009 | Wilcox | G09F 27/008 362/248 |
| 2009/0323330 | A1 * | 12/2009 | Gordin | F21V 5/007 362/235 |
| 2010/0110710 | A1 | 5/2010 | Abe | |
| 2010/0195326 | A1 * | 8/2010 | Boxler | F21K 9/68 362/235 |
| 2011/0103057 | A1 * | 5/2011 | Chen | F21V 7/0025 362/240 |
| 2011/0242822 | A1 * | 10/2011 | Rong | F21V 7/0033 362/346 |
| 2011/0273881 | A1 | 11/2011 | Domagala et al. | |
| 2012/0008320 | A1 * | 1/2012 | Tu | F21V 11/02 362/235 |
| 2013/0194808 | A1 * | 8/2013 | Guercio | F21V 7/0025 362/296.08 |
| 2014/0084809 | A1 | 3/2014 | Catalano | |
| 2015/0308655 | A1 * | 10/2015 | Holmes | F21V 5/045 362/235 |
| 2015/0316229 | A1 * | 11/2015 | Jurik | F21V 5/046 362/237 |
| 2016/0320050 | A1 * | 11/2016 | Barnhart | F21L 4/02 |
| 2020/0056764 | A1 * | 2/2020 | Baxter | F21V 21/30 |

FOREIGN PATENT DOCUMENTS

| | | | | |
|---|---|---|---|---|
| DE | | 1121562 B * | 1/1962 | F21V 11/04 |
| DE | 202014100656 U1 | | 5/2015 | |
| EP | | 629813 A1 * | 12/1994 | F21V 11/02 |
| WO | WO-2019068675 A1 * | | 4/2019 | F21V 7/0083 |

* cited by examiner

INTEGRATED LOUVRES FOR BEAM CONTROL IN AN LED LIGHTING DEVICE

RELATED APPLICATIONS AND CLAIMS OF PRIORITY

This application claims priority to U.S. Provisional Application No. 62/717,168, filed Aug. 10, 2018, the disclosure of which is fully incorporated by reference.

BACKGROUND

Light emitting diodes (LEDs) are commonly used in lighting devices or luminaires—for example in the architectural lighting industry in stores, offices and businesses as well as in the entertainment industry in theatres, television studios, concerts, theme parks, night clubs and other venues. Some typical optical devices used in HID luminaires include reflectors, lenses, visors, or the like and are designed to reflect, collimate, block, or otherwise direct light so to produce the desired beam pattern at or near the target area. For example, a well-known way to light large areas economically is to erect several poles at spaced positions around the area to be lighted, and elevating one or more bowl-shaped reflectors, each surrounding a luminaire including multiple LEDs. By appropriate design and aiming of the bowl-shaped reflectors and LED placement and design of the fixtures, the beams can be directed from various directions to compositely light the target area in a relatively uniform manner.

However, to achieve the type of light levels that are required for outdoor spaces such as baseball, football fields, music arenas, etc., relatively powerful light sources are required, and simply adjusting the direction of the light beam does not control spill light or glare resulting in the lighting of undesired areas. For example, a homeowner across the street from the sports field may have issues with the spill light, and spectators sitting in the bleachers may be subjected to unwanted glare. Such spill light is wasteful (necessitates generation of greater amounts of light to meet the lighting requirements in the target area), a potential nuisance, and/or may be hazardous (e.g., to drivers on a road adjacent to target area).

Existing luminaires control the spill light somewhat by varying the reflector design or other optical components of the luminaire and/or the mounting orientation. However, existing reflectors provide a uniform beam spread and direction around the periphery of the luminaire with no ability to configure or modify the beam spread in order to avoid lighting desired areas. Furthermore, typical LED fixtures having multiple small light sources (e.g., LED modules) function similarly Each small light source has an optic (reflective or refractive lens) which creates a particular beam pattern that the beam from the fixture is simply a brighter version of a single beam. However, this also requires controlling the beam direction of each small light source.

A light fixture which provides a beam pattern that is more easily varied and controlled is therefore useful and desirable in the lighting industry. This document describes lighting fixture that are directed to solving the issues described above, and/or other problems.

SUMMARY

An optical structure for controlling distribution of light generated by a light source is disclosed. The optical structure may include a primary optics disposed relative to the light source and configured to reflect light generated by the light source towards a target region. The optical structure may also include a secondary optics disposed and aligned relative to the primary optics. The secondary optics may be configured to at least partially block light generated by the light source from illuminating a region outside the target region.

In certain scenarios, the primary optics may include a parabolic shaped reflector, with the light source positioned at the focal point. Optionally, the primary optics may also include a visor attached to an outer periphery of the parabolic shaped reflector that is configured to prevent spillage of light in a second region outside the target region.

In one or more scenarios, secondary optics may be an arc shaped visor that comprises: at least one reflective surface facing the light source or at least one biased surface facing the light source. Optionally, the secondary optics may be attached to the primary optics via a pair of hinges that allow for adjustment of orientation of the secondary optics. The secondary optics may be attached to the primary optics in an upper half portion. In such scenarios, the target region may include a first target region and a second target region separated by the region outside the target region, and the secondary optics may be oriented to block light generated by the light source from illuminating the region outside the target region. The light generated by the light source may still be allowed to reach the first target region and the second target region.

In at least one scenario, the secondary optics may be manufactured using optically reflective silicone.

In one or more scenarios, the secondary optics may include one or more concentric rings, each including at least one reflective surface or at least one biased surface. Optionally, the secondary optics may be configured to provide a bull's eye type light distribution.

In other scenarios, the secondary optics may include one or more half circle rings, each including at least one reflective surface or at least one biased surface.

In some other scenarios, the secondary optics may include one or more straight panels disposed inside a circular ring.

In at least one scenario, one or more properties of the secondary optics may be configured based on a desired cut-off angle for at least partially blocking light generated by the light source from illuminating the region outside the target region. The one or more properties may include: tilt, orientation, dimensions, relative position, size, reflectivity, biasing, shape, or the like.

In some scenarios, a lighting device may include the above optical structure for controlling distribution of light generated by a light source of the lighting device.

Optionally, the lighting source may include a linear arrangement of a plurality of light emitting devices (LEDs). Each of the plurality of LEDs have a corresponding cut-off angle for at least partially blocking light generated by that LED from illuminating a corresponding region outside the target region.

In some scenarios, the light source may include a plurality of light emitting devices (LEDs) arranged in two or more concentric circles. The secondary optics may be oriented such that it will block light generated by at least one of the concentric circles from illuminating the region outside the target region while allowing light generated by another one of the concentric circles to reach the region outside the target region.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

Figure 1:
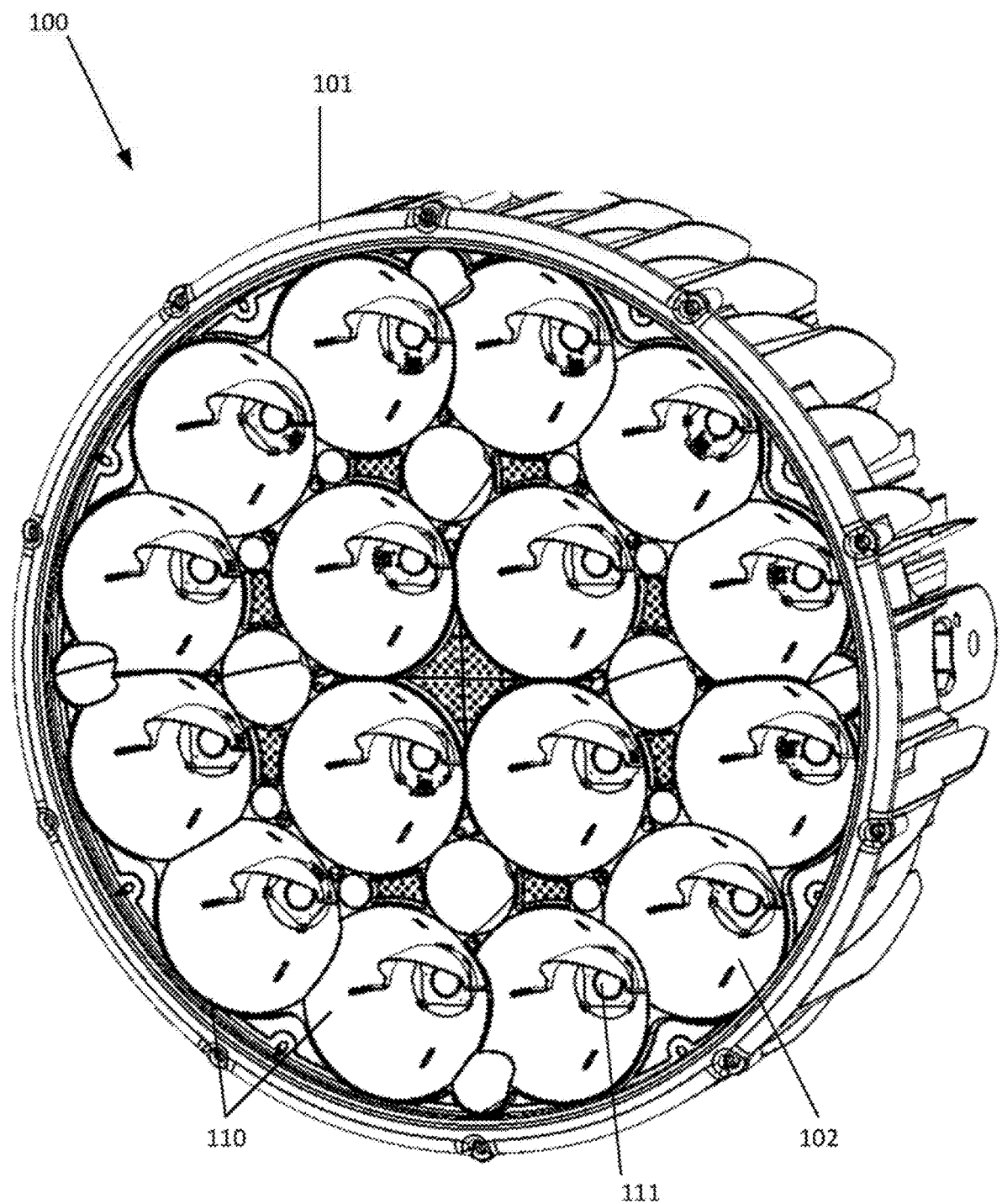
FIG. 1 illustrates a perspective view of an example lighting device.

FIG. 1 illustrates an example of one embodiment of a lighting device 100 that may include a various lighting modules. As shown in FIG. 1, the lighting device 100 includes a housing 101 that encases various components of the lighting device 100. The housing 101 includes an opening in which an optical radiation source, such as any number of lighting modules 110 that include LEDs 111 fitted with an optical arrangement 102 are included. Any number of lighting modules 110, such as one, two, three, four, five or more, sufficient to provide a high intensity LED device, may be positioned within the opening in any configuration. In various embodiments, a lighting device may include multiple types of lighting modules. For example, a lighting device may include a first type of lighting module having LEDs that are configured to selectably emit white light of various color temperatures, along with a second type of lighting module having LEDs that are configured to selectably emit light of various colors.

The device's housing 101 may include a body portion that serves as a heat sink for dissipating heat that is generated by the LEDs. The body/heat sink may be formed of aluminum and/or other metal, plastic or other material, and it may include any number of fins on the exterior to increase its surface area that will contact a surrounding cooling medium (typically, air). Thus, the body portion may have a bowl shape, the lighting modules 110 may fit within the opening of the bowl, and heat from the LEDs may be drawn away from the lighting modules 110 and dissipated via the fins on the exterior of the housing 101. Other shapes, such as the football-shape shown, or a square, circle, oval, diamond, rectangle, or the like are within the scope of this disclosure.

While the lighting modules 110 are positioned at one side of the body, the opposing side of the body may include or be connected to a power supply (not shown here). The power supply may include a battery, solar panel, or circuitry to receive power from an external and/or other internal source. The external housing of the power supply also may include fins to help dissipate heat from the power supply. Power wiring may be positioned within the body to direct power from the power supply to the LEDs.

The housing 101 also may include a controller (such as a processor and memory with programming instructions, an application-specific integrated circuit or a system-on-a-chip) configured to selectively control which groups of LEDs in the LED modules are to receive power, and to vary the power delivered to the LEDs by methods such as pulse width modulation. The housing 101 may be attached to a support structure, such as a base or mounting yoke, optionally by one or more connectors.

One or more control circuits (such as control cards) may be positioned under, adjacent to or otherwise near the LEDs to provide power to each LED set. The LEDs to which power is supplied may be selectively controlled by control circuitry such as that described below in this document. The control card may include a supporting substrate made of a material such as fiberglass, and a non-transitory computable-readable memory for storing programming instructions and/or monitored data and/or operational history data, one or more processors, a field programmable gate array (FPGA), application specific integrated circuit (ASIC) or other integrated circuit structures, and a received for receiving control signals from an external transmitter.

Figure 2A:
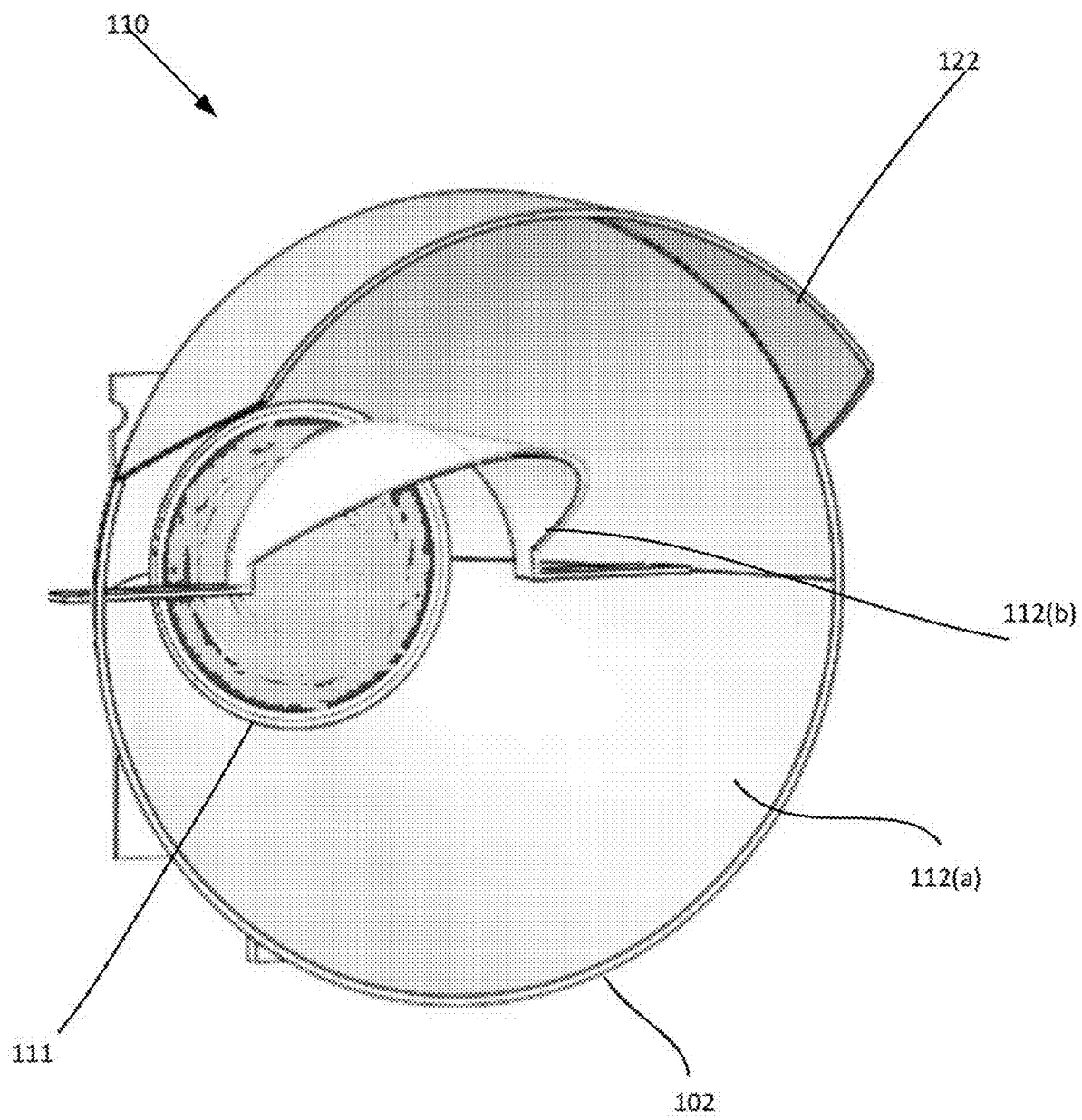
FIG. 2A illustrates a perspective view of an example lighting module for a lighting device such as that of FIG. 1.
Figure 2B:
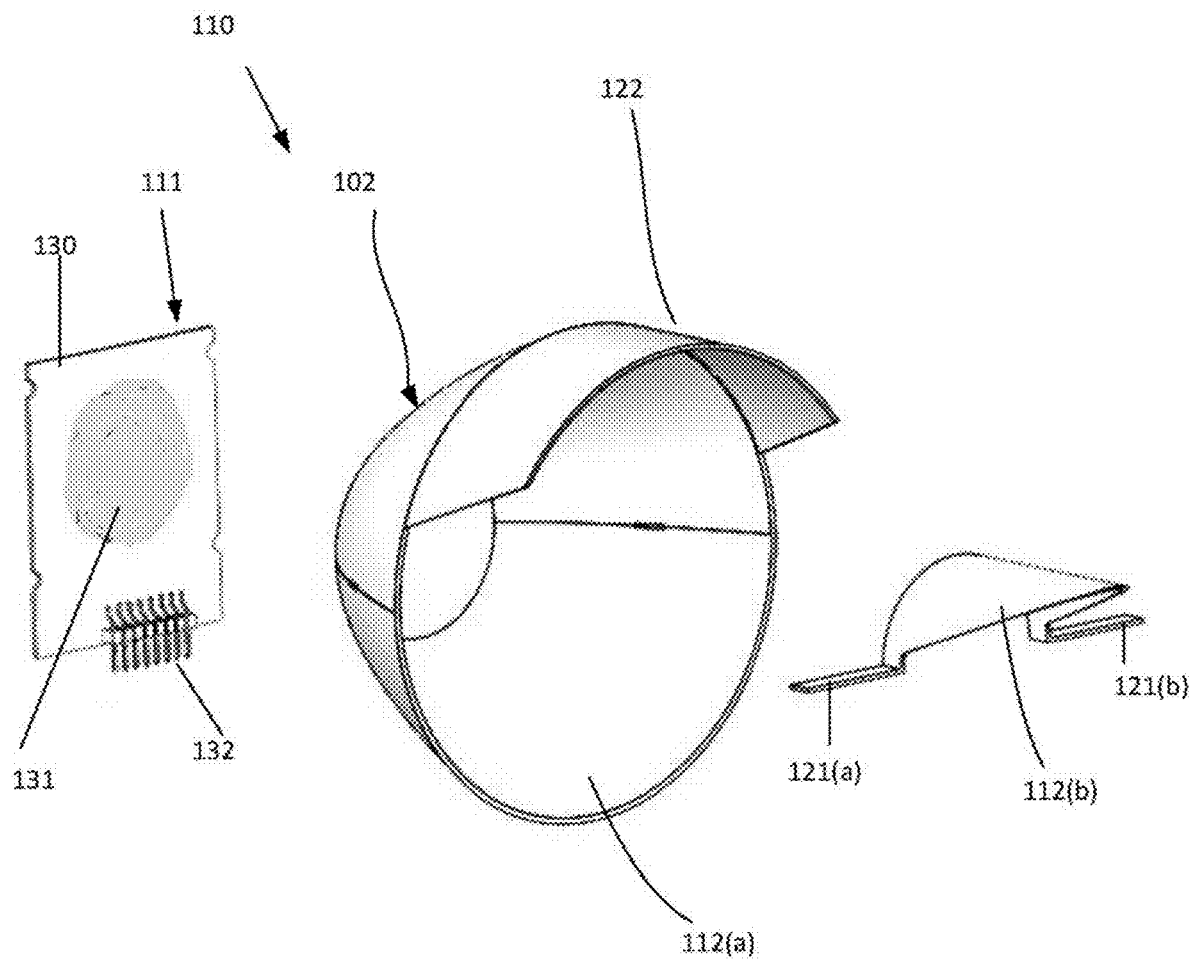
FIG. 2B illustrates an exploded view of the lighting module of FIG. 2A.

FIG. 2A illustrates an enlarged view of a lighting module 110, and FIG. 2B illustrates an exploded view of a lighting module 110. As shown in FIGS. 2A and 2B, each lighting module 110 includes a light source 111 fitted with an optical arrangement 102. In an embodiment, optical arrangement 102 includes a primary optics 112(a) and a secondary optics 112(b). It should be noted that while the primary optics 112(a) is illustrated as an individual structure per lighting module, it may be configured as a single piece array of multiple primary optics to be paired with an array of multiple LED modules.

As shown in FIG. 2B, each light source 111 includes a substrate 130 on which one or more LEDs or LED dies 131 (e.g., chip-on board (COB)) are positioned (e.g., under a common lens), to emit light away from the lighting device 100. In addition, the substrate 130 may be of any shape, such as a square, circle, oval, diamond, rectangle, or any other shape. The LEDs 131 (or multiple dies) may be subgrouped so that each subgroup is wired to operate as one electrical device with two contacts, irrespective of the number of dies or LEDs. In various embodiments, a light source 111 may include a single LED die of a single color or a group of LED dies of the same or differing colors. For example, a light source 111 may include one each of a red, green, blue and white dies. While not shown in FIGS. 2A and 2B, the light source 111 may also one or more lens or other optical elements configured to control the beam angle, stray light, color fringing, or other optical characteristics of light emitted by of the lighting module 110. Various conductors and/or electronic devices, and lenses for the LED sets, may be mounted on the substrate 130. For example, a set of module-level conductors 132 may be connected to the lighting device's power source (via a controller) and ground. Each module-level conductor may be connected to one of the conductive elements for each LED set (described below) to selectively deliver current to one of the LED sections in each LED set.

In one or more embodiments, optical arrangement 102 includes a primary optics 112(*a*) and a secondary optics 112(*b*). The primary optics 112(*a*) may be an optical structure that partially or completely surrounds the light source 111 and is configured to control one or more characteristics of the light emitted by the light source 111. For example, the primary optics 112(*a*) may control various light beam characteristics from the lighting module 110 such as, without limitation, beam shape, direction, spread, quality, or the like. The primary optics 112(*a*) may also protect the light source 111 from environmental conditions such as dust, debris, water, sports balls, or the like. The height, shape, width and/or other dimensions of various components the primary optics 112(*a*) may be configured to control various light beam characteristics from the lighting module 110 and the lighting device 100.

Examples of optical structure 112(*a*) may include optical elements such as, without limitation, reflectors, lens, refractors, prisms, or combinations thereof, and designed to provide the required optical characteristics of light. In certain embodiments, the optical structure 112(*a*) may be configured to provide total internal refection (TIR). The primary optics 112(*a*) may be configured in one or more of shapes such as, without limitation, parabolic, hyperbolic, planar, elliptical, an arc of a circle or other curved or segmented cross-section or other shape as would be readily understood by a person skilled in the art. In one or more embodiments, the primary optics 112(*a*) may be constructed from two or more pieces joined together (e.g., two half parabolic structures joined along a central axis). Alternatively, the primary optics 112(*a*) may be a single piece structure.

For example, as shown in FIGS. 2A and 2B, the primary optics 112(*a*) includes a polished parabolic shaped reflector as an optical element (single piece or multiple piece). The parabolic shaped reflector surrounds the light source 111, and the light source 111 is placed proximately to the focus of the parabolic shape. The parabolic shaped reflector 112(*a*) has a parabolic reflective surface that collimates all of the reflected light in a direction away from the light source 111 and controls the beam shape and beam spread (as described below with respect to FIG. 4). The reflective surface of the optical structure 112(*a*) may be composed of any material suitable for reflecting light rays that are incident upon the parabolic reflective surface. Examples may include, without limitation, reflective optical silicone, aluminum, mirror polished metal, silver, vacuum metalized silver or aluminum, anodized or coated sheet metal, or the like).

In some embodiments, the primary optics 112(*a*) may be a fully active reflector (i.e., all the surfaces of the primary optics 112(*a*) are configured to reflect light). Alternatively and/or additionally, the primary optics 112(*a*) may be a biased reflector (i.e., at least part of the structure is blocked from reflecting light by, for example, painting it black). Such biasing may further be used to control the beam shape, direction, or other light characteristics of light emitted by the light source 111.

Optionally, the primary optics 112(*a*) may also include a secondary visor 122 integrated with and/or removably attached to an outside edge (e.g., top) of the primary optics 112(*a*). The secondary visor 122 may block light rays from spreading in a suitable direction (e.g., above the lighting module 110 when placed on a top edge of the primary optics 112(*a*)). The secondary visor may either block light rays by absorbing them (e.g., if painted black) and/or may reflect light rays in a suitable direction.

The optical arrangement 102 also includes a secondary optics 112(*b*) which is removably attached to or mounted on the inside of the primary optics 112(*a*). In an embodiment, the secondary optics 112(*b*) may include a highly reflective surface (e.g., optically reflective silicone, polished metal, etc.) that faces the light source 111 and extends outwardly towards the opening of the lighting module 110, Thus, the secondary optics 112(*b*) acts as a visor that reflects spill light at a desired angle (e.g., upwards) while allowing or redirecting light towards the target area 241 below the secondary optics 112(*b*)). Optionally, the primary optics 112(*b*) may be a biased reflector that absorbs light instead of reflecting it in a different direction (i.e., at least part of the structure is blocked from reflecting light by, for example, painting it black). Such biasing may further be used to control the beam shape, direction, or other light characteristics of light emitted by the light source 111.

The secondary optics 112(*b*) can take various forms, shapes, and sizes, depending upon the desired light output distribution.

In an embodiment, the secondary optics 112(*b*) may be removably attached to the interior of the primary optics 112(*a*) at one or more attachment points (or point arrays) using any removable means such as without limitation, threads, clams, bolt screws, insertion into a notch, mounting brackets for receiving hinges included in the secondary optics 112(*b*) (or vice versa), radial support brackets, magnetic attachment, or the like. Alternatively, the secondary optics 112(*b*) may permanently attached to the interior of the primary optics 112(*a*), for example, during manufacturing, using adhesives, etc.

As shown in FIGS. 2A and 2B, the secondary optics 112(*b*) may be a curved arc-shaped structure that is mounted inside the primary optics 112(*a*) in a downward facing manner, via two hinges 121(*a*) and 121(*b*) that are received in corresponding brackets in the primary optics 112(*a*). The mounting position of the secondary optics 112(*b*) may be configurable to obtain the desired light (i.e., beam) output and angle. For example, the body of the primary optics 112(*a*) may include multiple sets of brackets for receiving the hinges 121(*a*) and 121(*b*), and the appropriate brackets may be chosen to provide the desired light output and angle. While FIGS. 2A and 2B disclose the secondary optics 112(*b*) mounted in the upper half of the primary optics 112(*a*) to provide a beam output shown in FIG. 2C and FIG. 4, other positions, are within the scope of this disclosure. For example, the secondary optics 112(*b*) may be mounted in a bottom half portion the primary optics 112(*a*) in an upward facing manner to block light rays from reaching an object that is located at the ground level. Alternatively, the secondary optics 112(*b*) may be mounted in a tilted manner to block light rays from reaching a region 242 (or portion thereof, such as an object located in the region 242) outside of (e.g. to the sides of) the target area 241.

Additionally and/or alternatively, the secondary optics 112(*b*) may be pivotally movable relative to the position of the light source 111 (i.e., tilt up and down and/or rotate left and right) to adjust the orientation. The pivotal movement of the secondary optics 112(*b*) can also enable the modification of the illumination pattern (i.e., beam spread, angle, direction, etc.) generated by the lighting module. The possible movement of the secondary optics 112(*b*) is illustrated by arrows 150. In an embodiment, the rotation may be provided by rotatable coupling of the secondary optics to the primary optics 112(*a*). For example, the brackets included in primary optics 112(*a*) for receiving the hinges 121(*a*) and 121(*b*) may include attachment mechanisms to allow for pivoting (e.g., knuckle mounts, rotation sockets) with different rotational stop positions. The secondary optics 112(*b*) may be manually rotated or tilted to the desired orientation.

Optionally, the secondary optics 112(*b*) may be formed by insert molding and/or co-molding a suitable material for forming the secondary optics 112(*b*) (e.g., anodized aluminum) around a rigid carrier or wire structure. The co-molded material may form the arc-shaped reflective secondary optics 112(*b*), and the rigid carrier or wire form the hinges 121(*a*) and 121(*b*). This allows for use of two dissimilar materials for forming the reflective portion of the secondary optics 112(*b*) and the hinges 121(*a*) and 121(*b*) suitable selected for their respective functions. For example, the material for forming the reflective portion may be selected for providing desired reflective properties, and material for forming the hinges may be selected to provide mounting strength and movement capabilities. Moreover, use of a wire for forming the hinges 121(*a*) and 121(*b*) provides for a thin mounting structure that suspends a free floating reflector (112(*b*)) in the center, while limiting the amount of light blocked and/or reflected by the hinges 121(*a*) and 121(*b*).

Figure 2C:
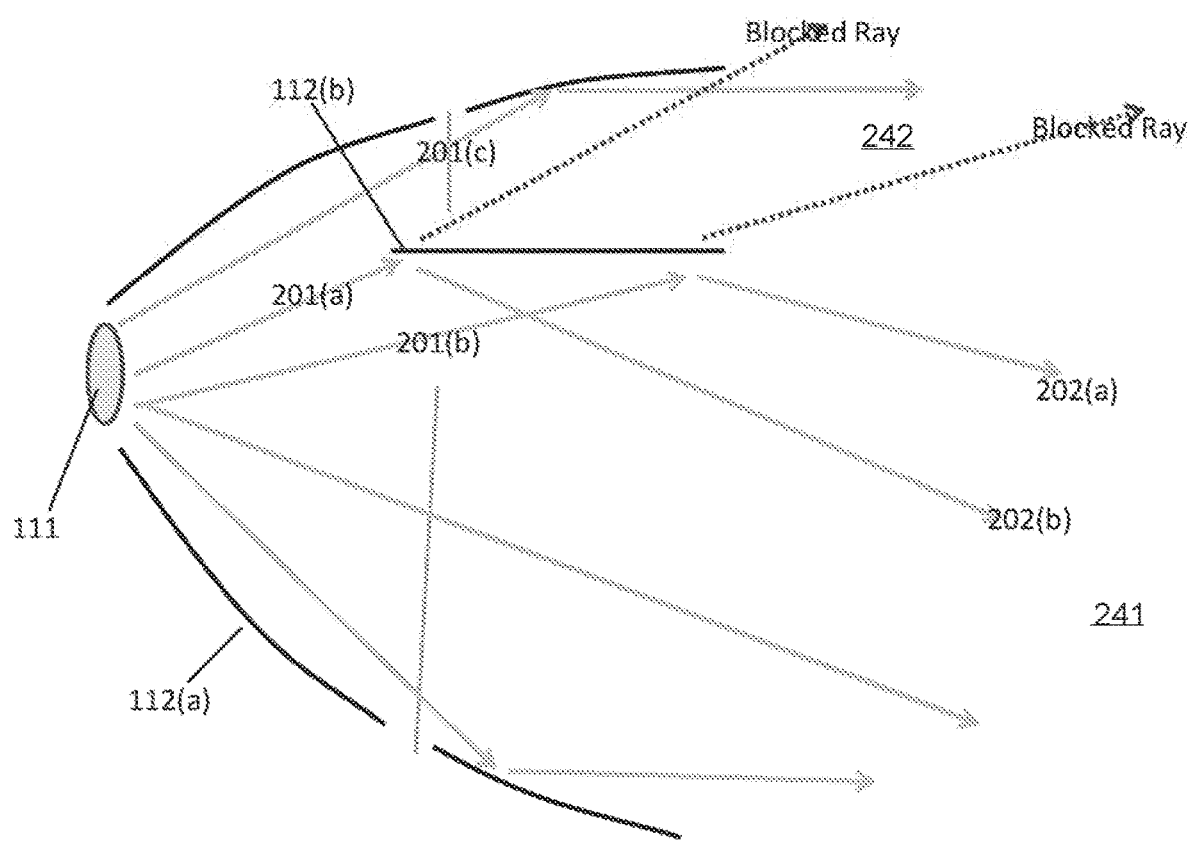
FIG. 2C is a ray diagram illustrating various light rays emitted from the lighting module of FIG. 2A.

FIG. 2C illustrates an example ray diagram of light distribution (i.e., collimation, reflection, and/or blockage) obtained using the optical structure 102 of FIG. 2A. As shown in FIG. 2A, light rays 201(*a*) and 201(*b*) are emitted from the light source 111 towards the secondary optics 112(*b*) located in an upper half of the optical structure 102. The secondary optics 112(*b*) may block the light rays 201(*a*) and 201(*b*) (blocking not shown here) by absorbing them if the surface of the secondary optics 112(*b*) on which the light rays 201(*a*) and 201(*b*) impinge is biased. Alternatively and/or additionally, the secondary optics 112(*b*) may at least partially reflect the light rays in a desired direction as shown in FIG. 2C (reflected rays 202(*a*) and 202(*b*)). It should be noted that in some embodiments, the secondary optics 112(*b*) may absorb some light and reflect some light (i.e., a lesser intensity of light) in the desired direction—for example, when the secondary optics 112(*b*) is partially biased.

As also shown in FIG. 2C, the position and/or orientation of the secondary optics may be configured such that certain light rays from extreme angles may be allowed to provide some amount of up light 201(*c*) in a desired direction (i.e., the light rays bypass the secondary optics 112(*b*) and get reflected/refracted/collimated by the primary optics 112(*a*). Such configurations of the secondary optics 112(*b*) may be useful to block light from reaching a building near a sports arena while allowing illumination of the air space to provide visibility of an air-borne ball (discussed below in more detail in FIG. 4). Optionally, the position and/or orientation of the secondary optics may be configured such that all light rays emitted by the light source 111 in the upwards direction (e.g., at an angle greater than a threshold) impinge upon the secondary optics 112(*b*), and are either blocked or reflected).

The total beam spread of the light may also be controlled by the orientation and positioning of the primary optics 112(*a*) and the secondary optics 112(*b*). The secondary optics 112(*b*) may also be rotated about an axis to various positions (e.g., about hinges 121(*a*) and 121(*b*)). For example, the total beam spread of light may be about 15 degrees to about 25 degrees when the secondary optics 112(*b*) is in a first position, about 18 degrees to about 23 degrees when the secondary optics 112(*b*) is in a second position, or about 20 degrees to about 21 degrees when the secondary optics 112(*b*) is in a third position, with respect to the LED assembly 111.

Figure 3A:
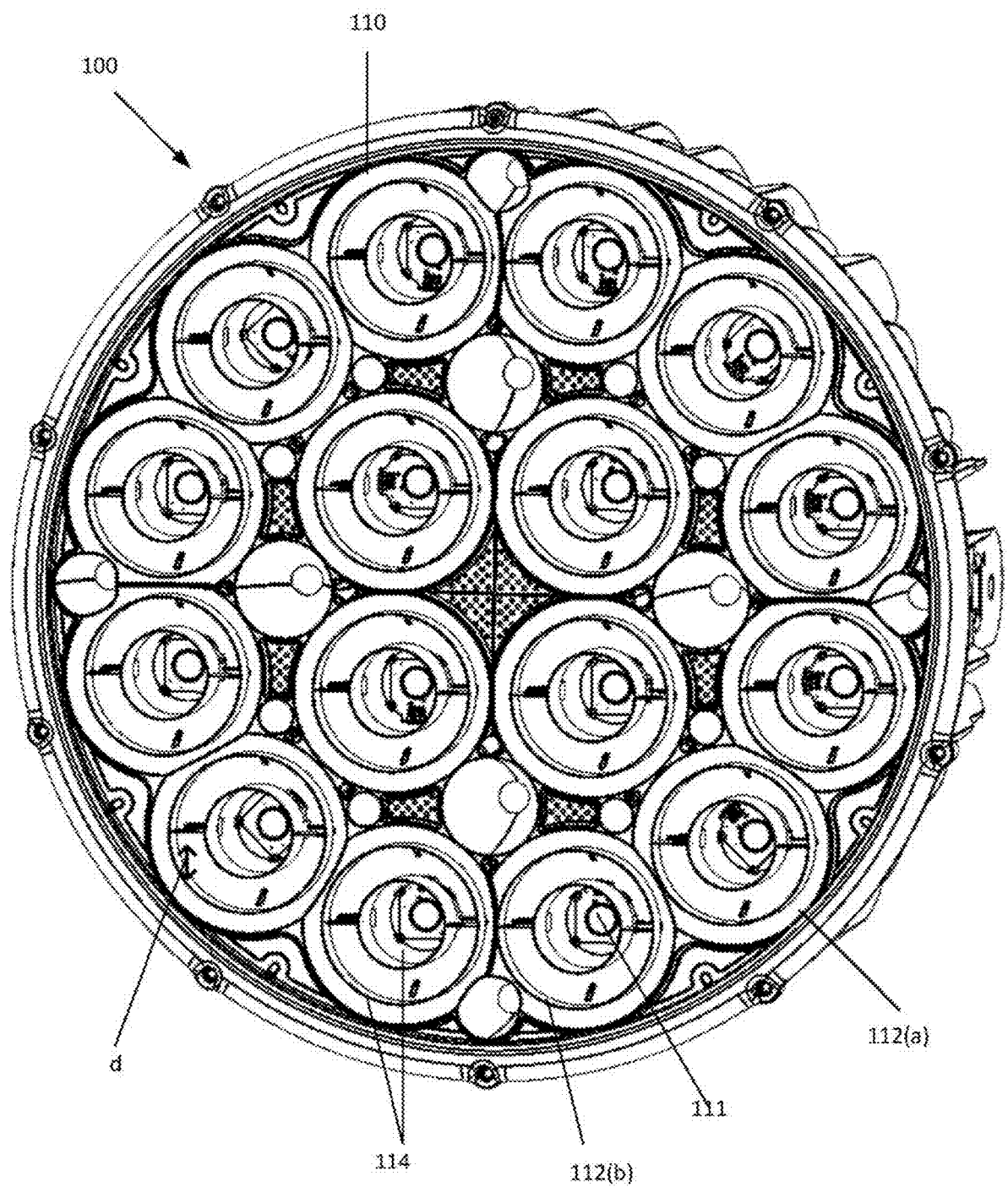
FIG. 3A illustrates a front perspective of an example embodiment of a lighting device.
Figure 3B:
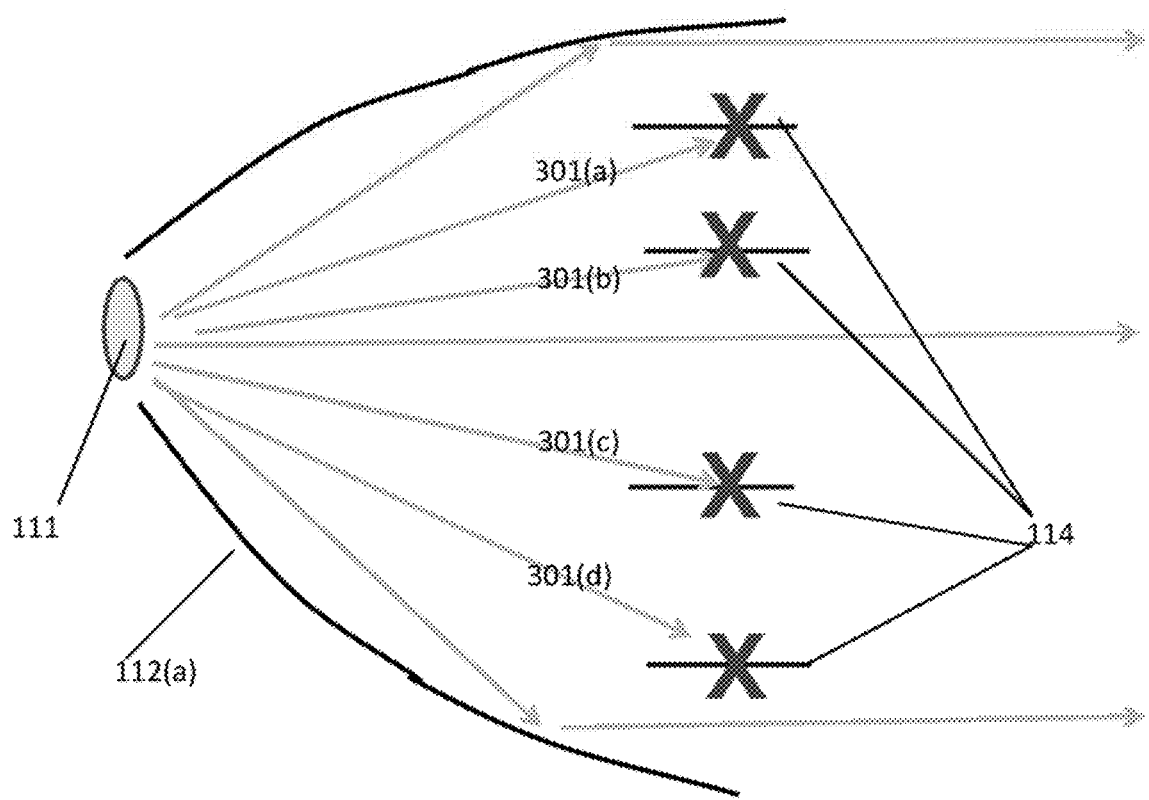
FIG. 3B is a ray diagram illustrating various light rays emitted from a lighting module of FIG. 3A.
Figure 3C:
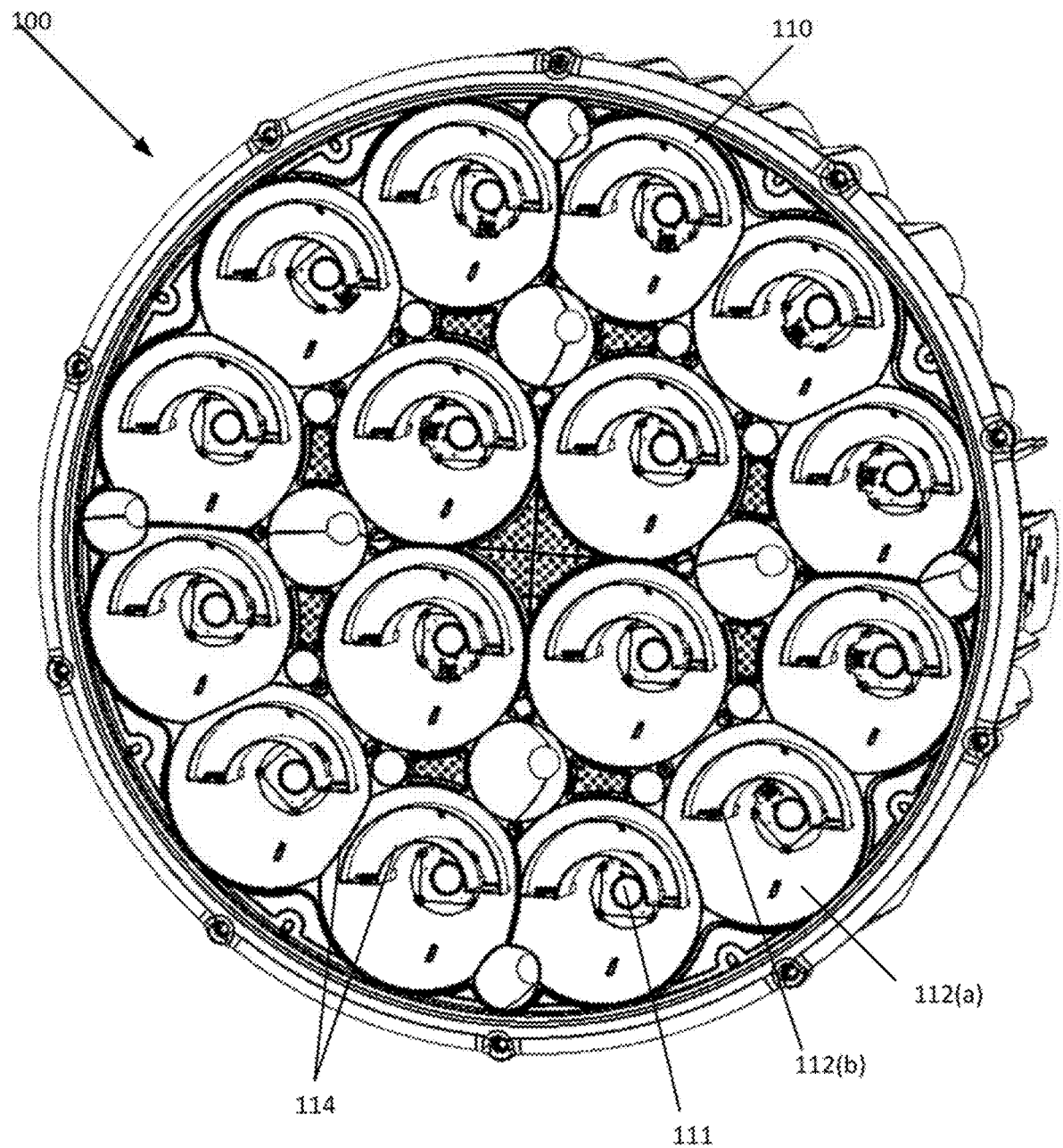
FIG. 3C illustrates a front perspective of an example embodiment of a lighting device.

Different arrangements and/or shapes of the secondary optics 112(*b*) are also within the scope of this disclosure. FIGS. 3A, 3C, and 3E illustrate perspective views of different example shapes and/or arrangements of the secondary optics 112(*b*).

For example, as shown in FIG. 3A, the secondary optics 112(*b*) may include one or more circular rings 114 (e.g., two shown in FIG. 3A) concentrically arranged inside the opening of the primary optics 112(*a*). Each ring may have a planar surface having a width "d", the inner surface of which may be reflective and/or biased to reflect light in a desired direction and/or block spill light outside of the ring. The light output obtained using the secondary optical arrangement 112(*b*) is illustrated in FIG. 3B. For example, FIG. 3B illustrates an example embodiment in which the planar surfaces of the rings 114 facing the light source 111 are fully biased and are configured to absorb all light rays (301(*a*), 301(*b*), 301(*c*), and 301(*d*))—shown using "X". The only light rays allowed to pass through the optical structure 102 are the light rays that bypass both the rings 114 and the primary optics 112(*a*), or that are reflected in a desired direction by the primary optics 112(*a*). Optionally, some or all of the light rays 301(*a*), 301(*b*), 301(*c*), and 301(*d*) may be at least partially reflected in a desired direction (not shown here). As such, the light distribution obtained may be a bull's eye shaped light output concentrated inside the rings 114. The circular shape of the rings 114 may result in an equal light distribution control in all directions.

The direction of the light output may be adjustable by adjusting the orientation (rotation or tilt) of the planar surface of the rings 114 with respect to the light source 111. For example, a light output in a direction perpendicular light source 111 may be obtained by orienting the planar circumference of the rings 114 perpendicular to the light source 111. The width and thickness of the circumference, shape, diameter, orientation, biasing, reflectivity, and/or other properties of each ring (e.g., circular, square, oval, etc.), as well as the number of rings, may be determined based on the desired light output (e.g., beam spread, beam angle, etc.).

In another example shown in FIG. 3C, the secondary optics 112(*b*) may include one or more half circular rings 114 (e.g., two shown in FIG. 3C) concentrically arranged inside the opening of the primary optics 112(*a*). The location of the half rings 114 (e.g., downward facing in the upper half, upward facing in the lower half, etc.) may determined based on the desired light output. Each half ring may have a planar surface having a width "d", the inner surface of which may be reflective and/or biased to reflect light in a desired direction and/or block spill light outside of the half ring.

Figure 3D:
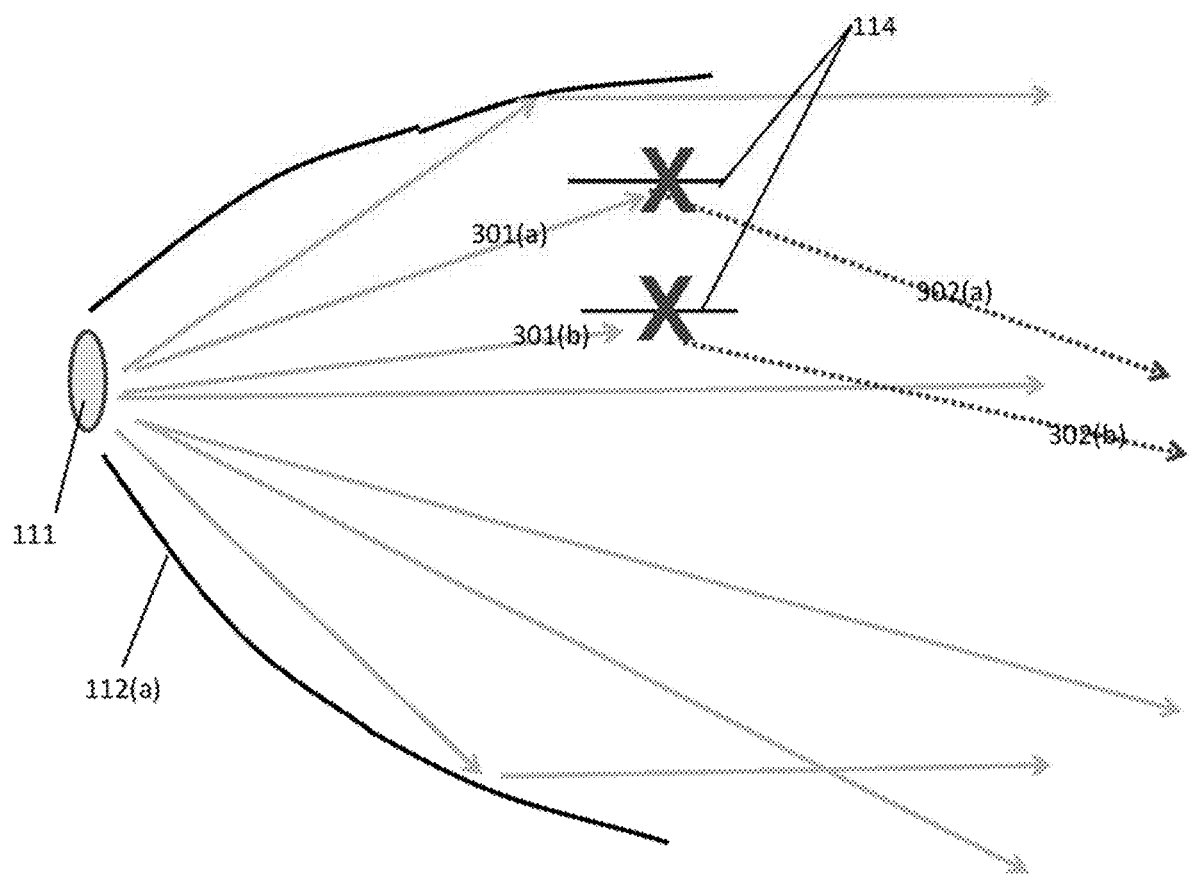
FIG. 3D is a ray diagram illustrating various light rays emitted from a lighting module of FIG. 3C.
Figure 3E:
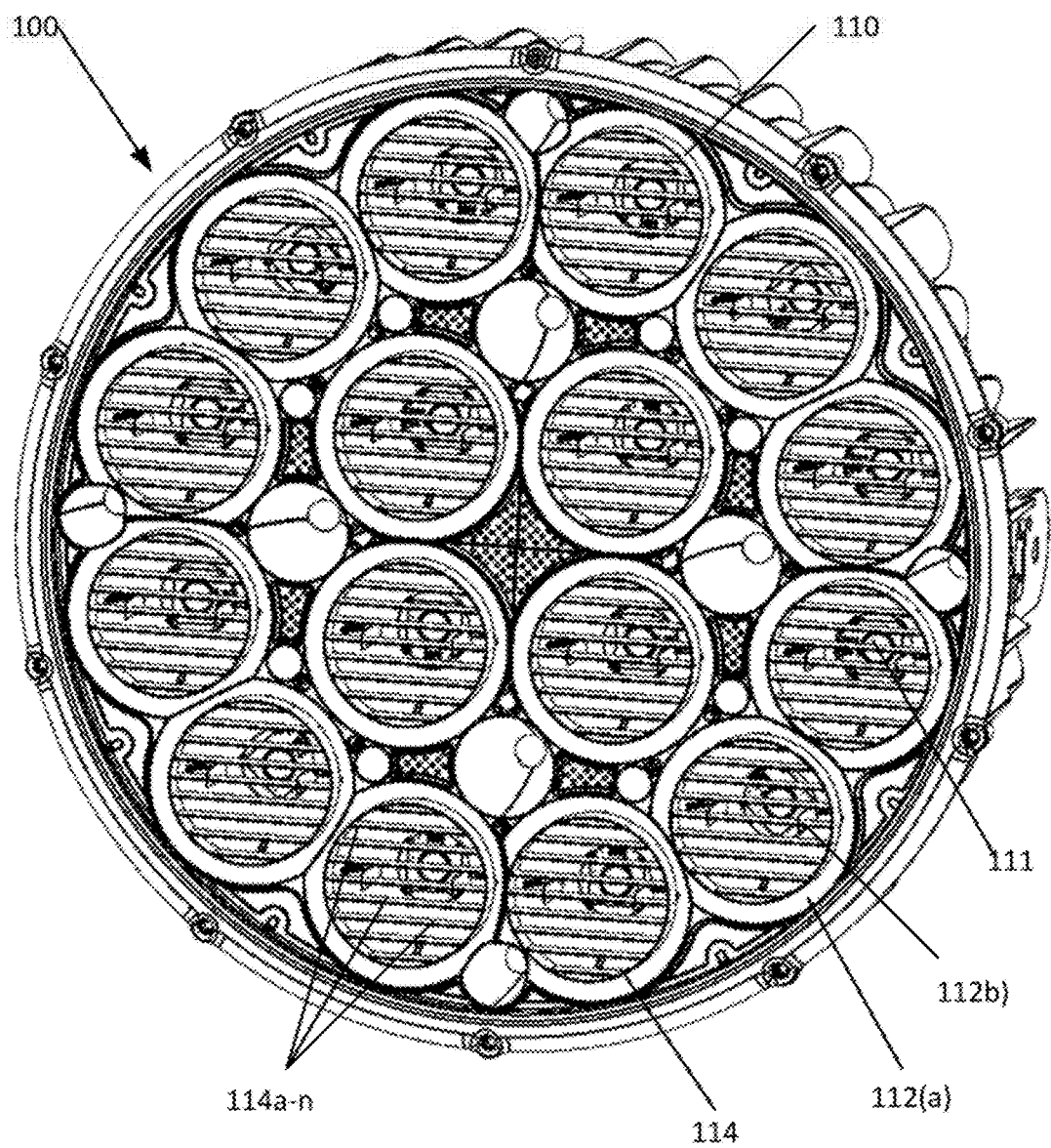
FIG. 3E illustrates a front perspective of an example embodiment of a lighting device.

The light output obtained using the secondary optical arrangement 112(b) is illustrated in FIG. 3D. For example, FIG. 3D illustrates an example embodiment in which the planar surfaces of the half rings 114 facing the light source 111 are fully biased and are configured to absorb all light rays (301(a) and 301(b))—shown using "X". The only light rays allowed to pass through the optical structure 102 are the light rays that bypass both the rings 114 and the primary optics 112(a), or that are reflected in a desired direction by the primary optics 112(a). Optionally, some or all of the light rays 301(a), and 301(b) may be at least partially reflected in a desired direction (302(a) and 302(b)—downwards direction if the half rings 114 are positioned in the upper half of the optical structure 102). As such, the light distribution obtained may be a light output concentrated on the side that does not include the half circle ring(s) 114, while controlling (by blocking/reflecting) light in the direction in which the half ring(s) are present.

The direction of the light output may be adjustable by adjusting the orientation (rotation or tilt) of the planar surface of the rings 114 with respect to the light source 111. The width and thickness of the circumference, shape, diameter, orientation, and/or other properties of each ring (e.g., circular, square, oval, etc.), location of the half rings (e.g., upper half, lower half, left half, etc.), as well as the number of rings, may be determined based on the desired light output (e.g., beam spread, beam angle, etc.).

In yet another example shown in FIG. 3E, the secondary optics 112(b) may include one or more circular rings 114 (e.g., two shown in FIG. 3A) concentrically arranged inside the opening of the primary optics 112(a). Each ring may have a planar surface having a width "d", the inner surface of which may be reflective and/or biased to reflect light in a desired direction and/or block spill light outside the ring. Each ring may also include one or more straight panels 114a-n disposed inside the ring and parallel to a diametric axis of the ring. One or more surfaces of the panels 114a-n may be reflective and/or biased to reflect light in a desired direction and/or block spill light. Such a configuration of the secondary optics 112(b) may control the light differently in the horizontal plane versus the vertical plane. For example, uncontrolled light going up or down (if the panels are oriented horizontally) will be absorbed and/or reflected by the panels, and light going to the sides will not be stopped by the horizontal panels. As such, a narrow straight light distribution in the horizontal direction will be obtained (i.e., blocks light from spilling both above and below each panel 114a-n).

Figure 3F:
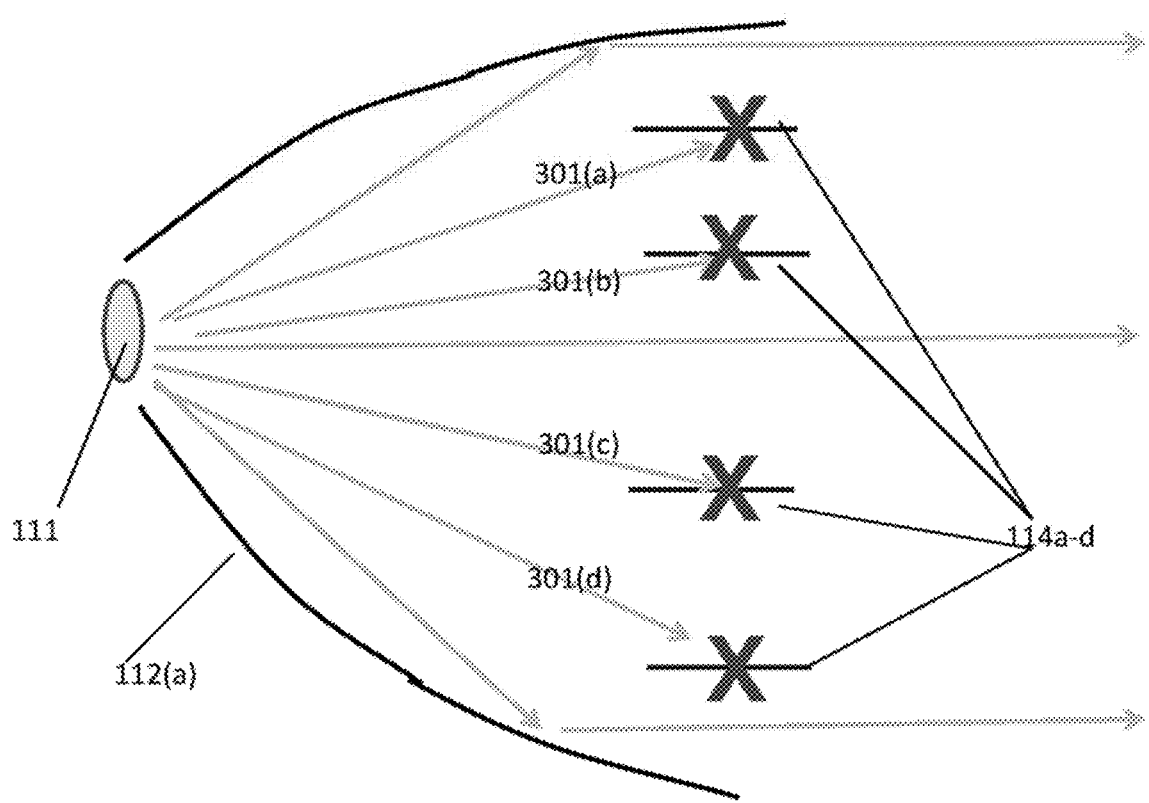
FIG. 3F is a ray diagram illustrating various light rays emitted from a lighting module of FIG. 3E.

The light output obtained using the secondary optical arrangement 112(b) is illustrated in FIG. 3F. For example, FIG. 3F illustrates an example embodiment in which the panels 114(a)-(d) facing the light source 111 are fully biased and are configured to absorb all light rays (301(a), 301(b), 301(c), and 301(d))—shown using "X". The only light rays allowed to pass through the optical structure 102 are the light rays that bypass both the panels 114(a)-(d) and the primary optics 112(a) (e.g., light rays going on the sides or between of the panels 114(a)-(d)), or that are reflected in a desired direction by the primary optics 112(a). Optionally, some or all of the light rays 301(a), 301(b), 301(c), and 301(d) may be at least partially reflected in a desired direction (not shown here).

The direction of the light output may be adjustable by adjusting the orientation (rotation or tilt) of the planar circumference of the rings 114 with respect to the light source 111. The width and thickness of the circumference; shape; diameter; orientation, number, location, and orientation of panels 114a-n in each ring; and/or other properties of each ring (e.g., circular, square, oval, etc.); as well as the number of rings, may be determined based on the desired light output (e.g., beam spread, beam angle, etc.).

As discussed above, the shapes, sizes, material, orientations, etc. of the reflective and/or biased surfaces provided by the primary optics 112(a) and/or the secondary optics 112(b) of each lighting module 110 have an effect, at least in part, on the light output of the lighting device 100. Furthermore, the light output from the lighting device 100 together with the position and orientation of the lighting device 100 relative to a target area 241 (also sometimes referred to herein as a target surface 241) may determine the illumination pattern received on the target area 241. From a design perspective, a desired illumination pattern on the target area 241 may, therefore, be used to determine parameters and properties of various components of the optical structure 102 (e.g., distances, alignments and orientations, type, shape, reflectivity, biasing etc.). The desired illumination pattern may also be used to determine the type, number, arrangement, color, disposition, or other properties of LEDs in the light source 111 (discussed below). During design of the lighting device 100, the type, number, arrangement, and disposition of the LEDs may be predetermined or may be determined in combination with the optical structure 102.

Characteristic parameters of the primary optics 112(a) that may have an effect on the light output may include, without limitation, the dimensions, relative alignment and positioning with other components of the lighting device (e.g., with respect to the light source, secondary optics, etc.), manufacturing material, shape, curvature, reflectivity, presence or absence of a visor, biasing, or the like.

Characteristic parameters of the secondary optics 112(b) that may have an effect on the light output may include, without limitation, dimensions, shape, type, relative positioning with other components of the lighting device (e.g., with respect to the light source, primary optics, etc.), curvature, reflectivity, number, orientation, manufacturing material, biasing, or the like.

Characteristic parameters of the light source 111 that may have an effect on the light output may include, without limitation, type, number, arrangement (e.g., concentric rings, linear, single COB, etc.), color, location, disposition, or the like.

Figure 4:
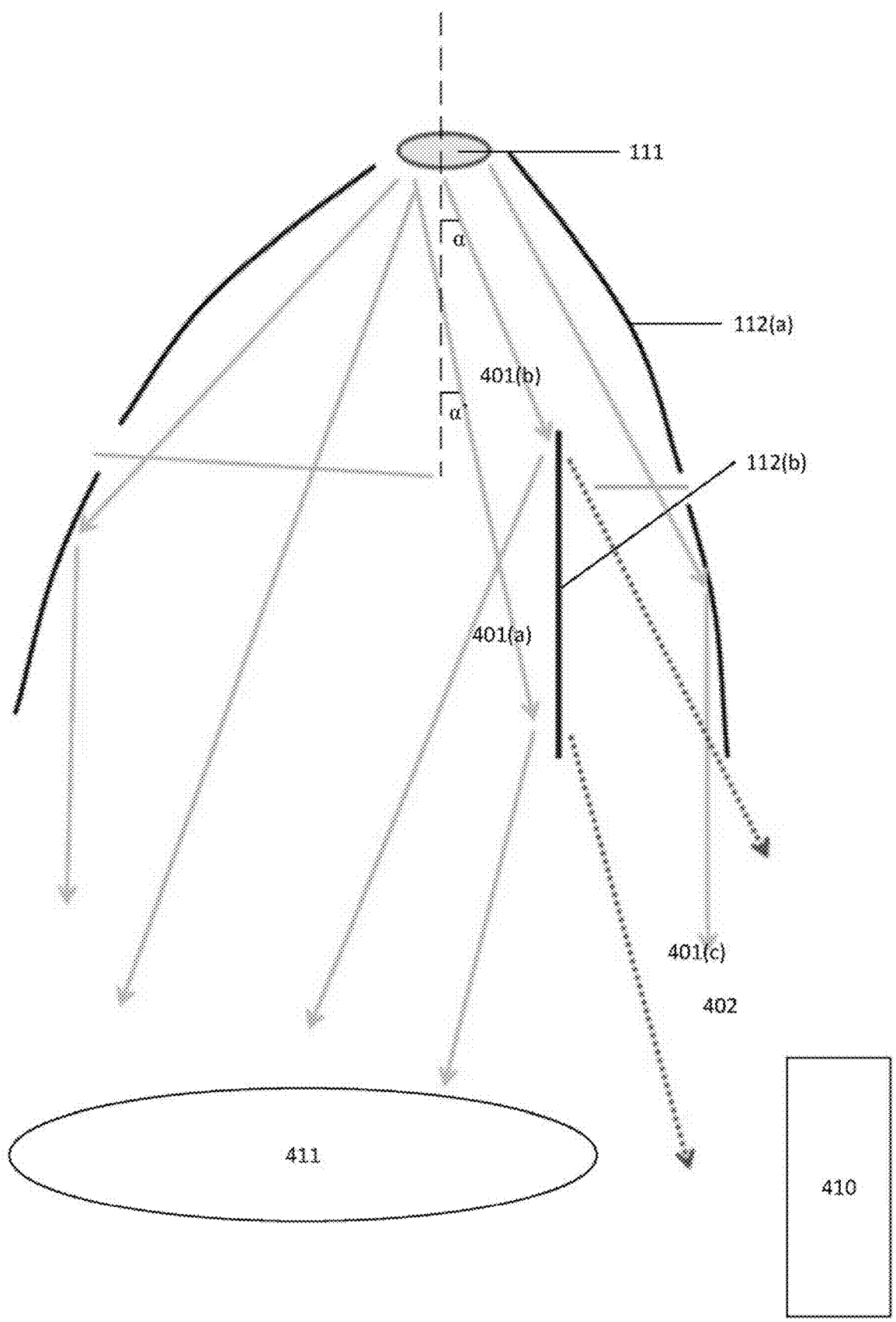
FIG. 4 is a ray diagram illustrating a light distribution on a target area from a lighting module of FIG. 1.

For example, in sports arenas or stadiums that require a light distribution that avoids light from reaching certain sections and concentrates light in certain other section, the optical structure of FIG. 2A may be used. The position, dimensions, orientation etc. of the secondary optics 112(b) of FIG. 2A may be configured to prevent light from reaching bleachers, neighboring houses, or other locations; to prevent upwards spill of light; to concentrate light on the playing field; etc. An example ray diagram of light distribution (i.e., collimation, reflection, and/or blockage) obtained using the optical structure 102 of FIG. 2A located above a target area (vertically) with is illustrated in FIG. 4. As shown in FIG. 4, light rays 401(a) and 401(b) may be prevented from reaching the building 410 by either absorbing them (not shown here) or by reflecting the light rays in a desired direction (402(a) and 402(b)), using the secondary optics 112(b). In some embodiments, the position and orientation of the secondary optics 112(b) may be configured such that certain light rays from extreme angles may be allowed to provide some amount of up light 401(c) in a desired direction. Such partial blockage using the secondary optics 112(b) may be useful to block light from reaching a house 410 near a soccer field 411 while allowing illumination of the air space 402 to provide visibility of an air-borne ball.

Figure 6A:
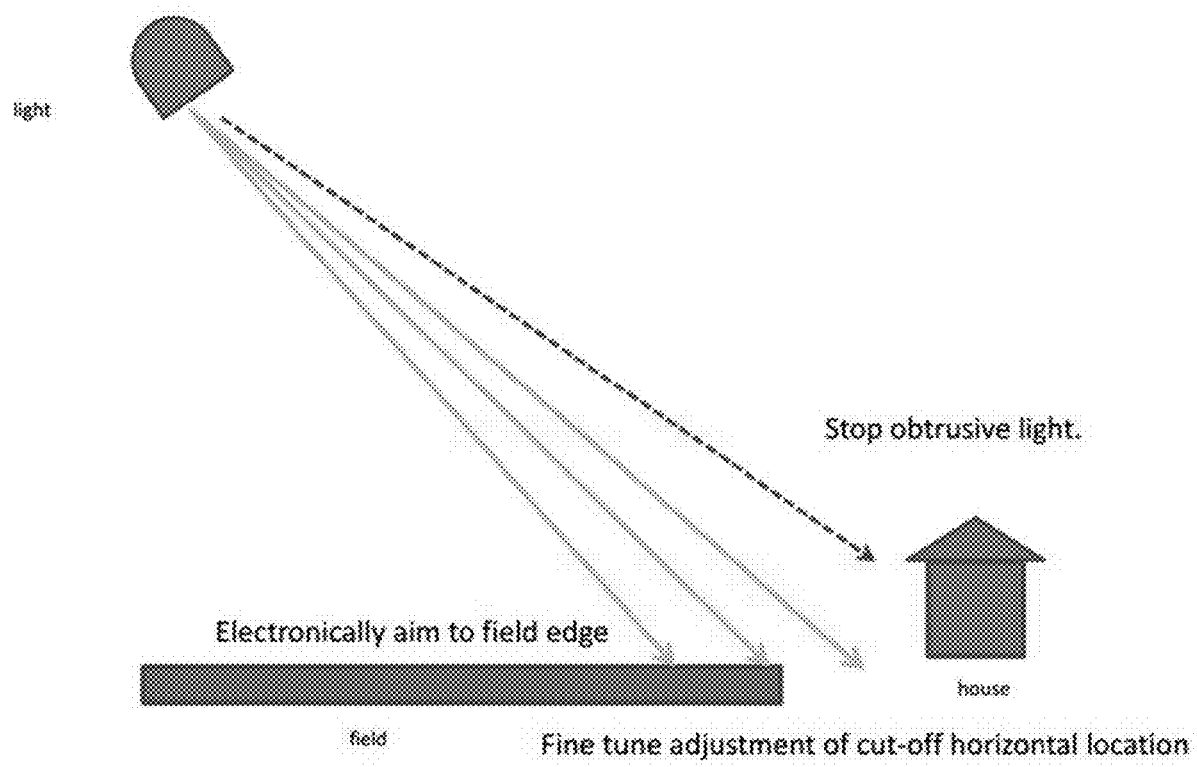
FIGS. 6A and 6B illustrate adjustment of cut-off angle based on horizontal and vertical light distribution requirements.

In certain embodiments, the orientation, dimensions, and positioning (or other properties) of the secondary optics 112(b) may be configured to adjust the blocking angle of light from the lighting device 100 based on the position of the house 410, the field 411 and/or the light source 100 (horizontal cut-off location). Here, the blocking angle refers to an angle at which when a light ray is emitted by the light source 111, it will impinge on the secondary optics 112(b) before being reflected and/or absorbed. For example, the range of blocking angles for the lighting device in FIG. 2A is between α-α'. Furthermore, an angle at which light rays are just allowed to pass around the secondary optics 112(b) without blockage (e.g., an angle slightly more than α or slightly less than α') is called a cut-off angle. For example, as shown in FIG. 6A, the cut-off angle may be determined to allow light to illuminate the furthest edges 611(a) and 611(b) of a field 611, while preventing light from reaching the building 610. The determined cut-off angle may then be used to determine the orientation, position, type, shape, etc. of the secondary optics 112(b) (or even the primary optics 112(a).

Figure 6B:
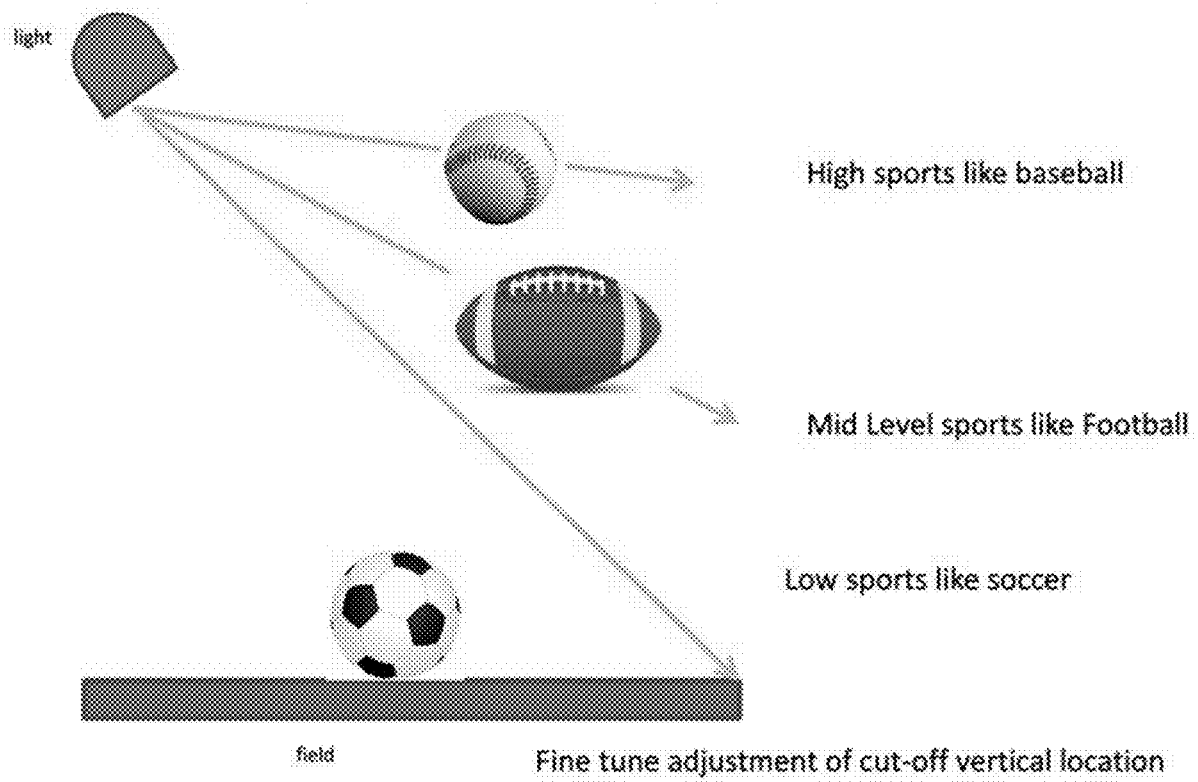

Additionally and/or alternatively, the orientation, dimensions, and positioning (or other properties) of the secondary optics 112(b) may be configured to adjust the blocking angle of light from the lighting device 100 based on the type of sport (vertical cut-off location). Specifically, the altitudes (i.e., in the vertically upwards direction with respect to the target area) at which light is blocked by the secondary optics may depend on the type of sport. For example, light may need to be blocked for sports like soccer (in which the ball is generally located close to the ground) at a lower altitude compared to sports like baseball (in which the ball is thrown high in the air). Therefore, tuning of the cut off-angle or the blocking angle may also be performed based on the type of sport, as shown in FIG. 6B.

Figure 5A:
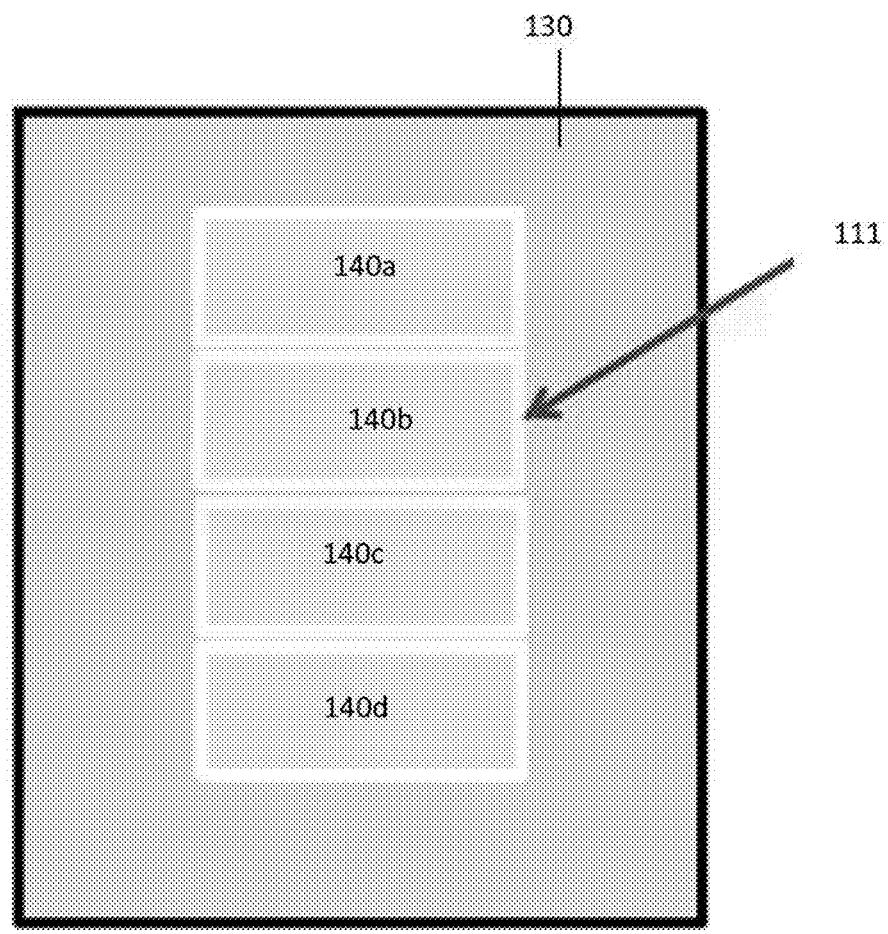
FIG. 5A illustrates an example light source including a linear arrangement.
Figure 5B:
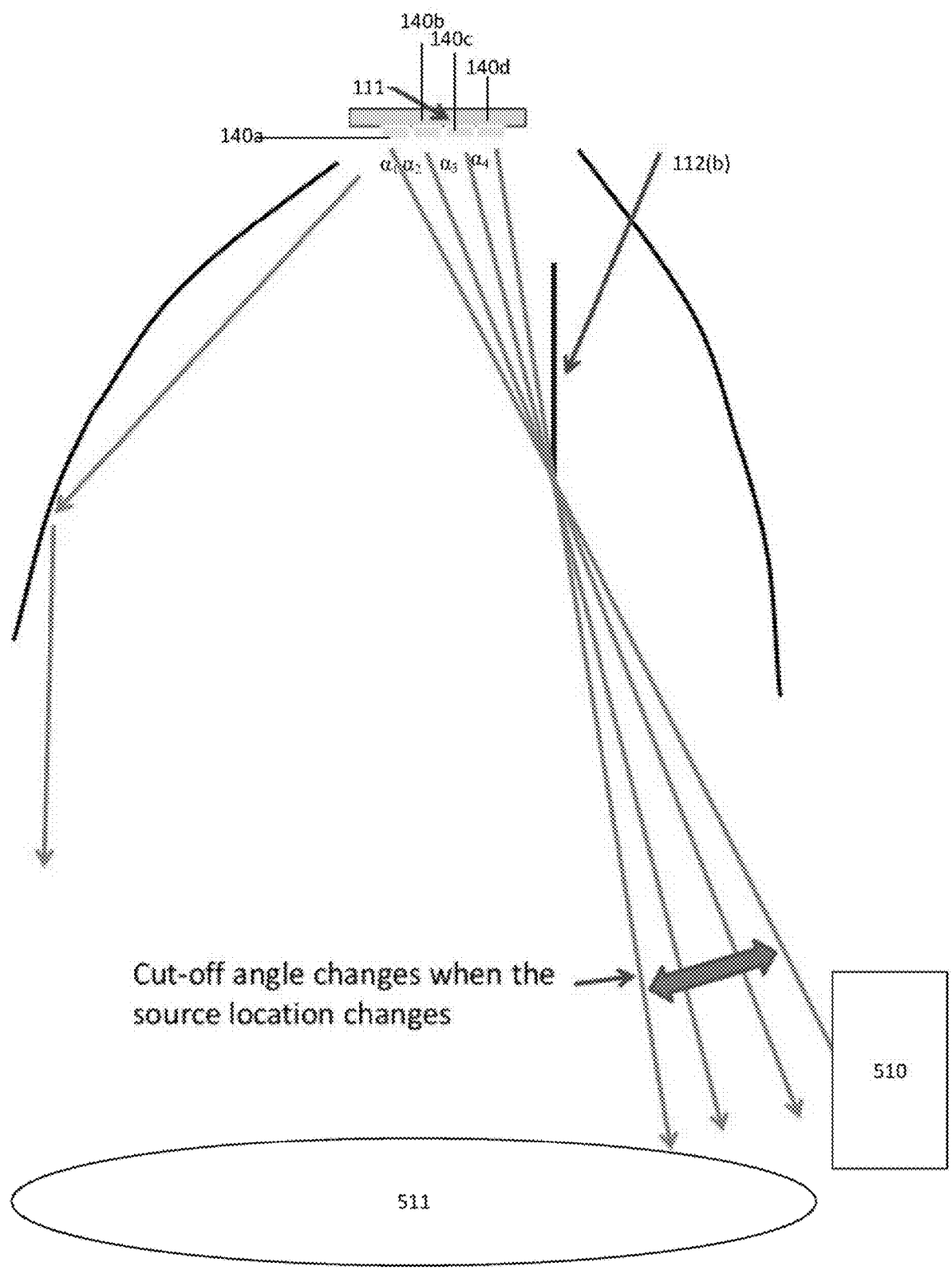
FIG. 5B is a ray diagram illustrating various light rays emitted from the light source of FIG. 5A.

In addition to the properties of the secondary optics 112(b), the cut-off angle for the lighting device 100 may also be configured based on the configuration or arrangement of LEDs, chips, dies, etc. in the light source 111. For example, as shown in FIG. 5A, light source 111 may include an array of multiple LED sources 140a-d (e.g., LEDs or dies) arranged in a linear pattern on the substrate 130. While FIG. 5A shows four LED sources, any number of LED sources may be used without deviating from the principles of this disclosure. Referring now to FIG. 5B, for a linear arrangement of LED sources 140a-d, the cut-off angle may be configured by turning ON or OFF of the LED sources 140a-d. For example, as shown in FIG. 5B, different cut-off angles ($\alpha_1$, $\alpha_2$, $\alpha_3$, or $\alpha_4$) at which light emitted by the light source 111 is not blocked by the secondary optics 112(b) may be configured by turning ON or OFF the corresponding LED source—140a, 140b, 140c, or 140d, and turning OFF or ON the remaining LED sources. Similarly, more than one LED source may be turned ON to allow light at a plurality of cut-off angles.

In certain embodiments, the desired cut-off angle may be determined based on the position of the building 510 with respect to the playing field area 511. For example, as shown in FIG. 5B, LED sources 140a, 140b, and/or 140c may be turned ON to illuminate the field, and the secondary optics 112(b) may block light emitted by the LED sources 140a, 140b, and/or 140c from reaching the building 510 (by reflecting and/or absorbing the light). Furthermore, LED source 140d may need to be turned OFF to prevent light from reaching the building 510 because the cut-OFF angle of LED source 140d does not allow for blocking of light from the LED source 140d from illuminating the building 510, by the secondary optics 112(b).

Figure 5C:
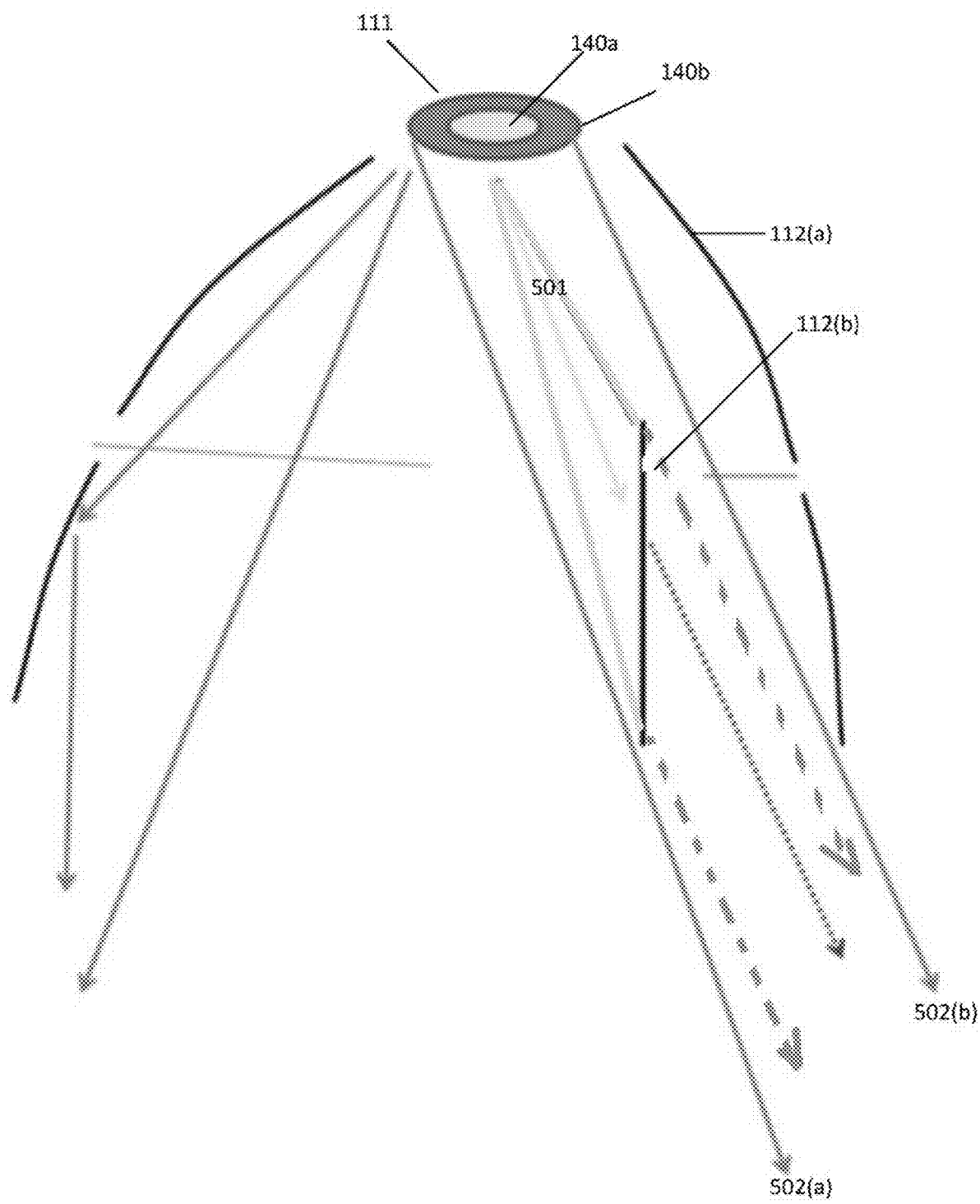
FIG. 5C is a ray diagram illustrating various light rays emitted from a light source comprising a circular arrangement.

While FIGS. 5A and 5B illustrate a linear arrangement of LED sources in the light source 111, the disclosure is not so limiting. For example, as shown in FIG. 5C, the light source 111 may include more than one LEDs, chips, dies, etc. arranged in concentric circles 140a and 140b (or other shape). The light distribution may be configured by turning ON or OFF different parts of the light source 111. As shown in FIG. 5C, when the inner portion 140a of the light source 111 is turned ON and the outer portion 140b is turned OFF, light rays 501 from the light source 111 some light rays may impinge on the secondary optics 112(b), and may be reflected and/or absorbed. Specifically, the light source 111 functions similar to the light source of FIG. 4 with a range of blocking angles. However, the secondary optics 112(b) may be configured such that when the outer portion 140b is turned ON, the secondary optics 112(b) may not block at least some of the light rays 502(a) and 502(b) from the outer portion 140b, allowing for illumination of areas that cannot be illuminated when only the inner portion 140a is turned ON. For example, for a sports arena, the secondary optics 112(b) may be configured to block light from the inner portion 140a from illuminating the viewer stands, bleachers, parking lots, etc., while allowing light from the outer portion 140b to illuminating some of those areas. This may be useful in scenarios where viewer stands, bleachers, parking lots, etc., may need to be illuminated (such as during half-time, at the end of game, etc.). For example, when the game is in progress only the inner portion 140a of the light source 111 may be turned ON to illuminate the playing field and blocking light from spilling into, for example, the viewer stands or parking lots. However, at half-times or the end of a game, the outer portion 140b of the light source 111 may be turned ON (while the inner portion 140a is ON or OFF) to illuminate the viewer stands or parking lots in order to aid the viewers in exiting the sports arena.

It should be noted that while FIG. 2C illustrates light distribution from the lighting module of FIG. 2A oriented to provide light in a horizontal direction, and FIGS. 4 and 5B-5C illustrate light distribution from the lighting module of FIG. 2A oriented to provide light in a downward direction, the disclosure is not so limiting. The principles of this disclosure may similarly be applicable to control light distribution from a lighting module irrespective of the lighting module's orientation (for example, the lighting module in FIGS. 6A and 6B is shown at an angle with respect to the target).

In some embodiments, all of the lighting modules 110 of the lighting device 100 may be configured to direct light in the same direction (e.g., each lighting module 110 may have identical primary optics 112(a), and similarly oriented and/ or identical secondary optics 112(b)). Alternatively and/or additionally, one or more of the lighting modules 110 of the lighting device 100 may be configured to direct light in different directions, with different beam spread, and/or have other optical characteristics such that the combination of the different beam patterns provides light in an overall desired beam pattern from the lighting device. For example, a lighting device may include some lighting modules that include the secondary optics of FIG. 2A and some lighting modules that include the secondary optics of FIGS. 3A, 3C, and/or 3E. Optionally, a lighting device may include lighting modules that all include the same type of secondary optics but whose configuration (e.g., orientation, tilt, position, etc.) is configured differently in different lighting modules In some embodiments, upon receipt of a command to emit light at a specified distribution pattern, a processor/controller of the lighting device (or in communication with the lighting device) may use an algorithm, reference a lookup table, or use other suitable methods to automatically determine the position and/or orientation of the primary optics 112(*a*) and/or the secondary optics 112(*b*). The lighting device may then provide instructions to a user to configure the position and/or orientation of the primary optics 112(*a*) and/or the secondary optics 112(*b*). Alternatively, the processor/controller may automatically configure the position and/or orientation of the primary optics 112(*a*) and/or the secondary optics 112(*b*) using, for example, motors, one or more gears, drive trains, or other movement mechanisms included in the lighting device. For example, the tilt angle may be automatically adjusted by the controller by controlling a drive mechanism associated with the hinges 121(*a*) and 121(*b*).

The processor may also control power delivery to the light source based on the desired light distribution by, for example, turning power supply ON/OFF to one or more LEDs or dies of the light source, using pulse width modulation (PWM), or the like. For example, as discussed above with respect to FIGS. 5A-5C, different portions or the light source may be turned ON or OFF depending upon the desired light output.

Figure 7:
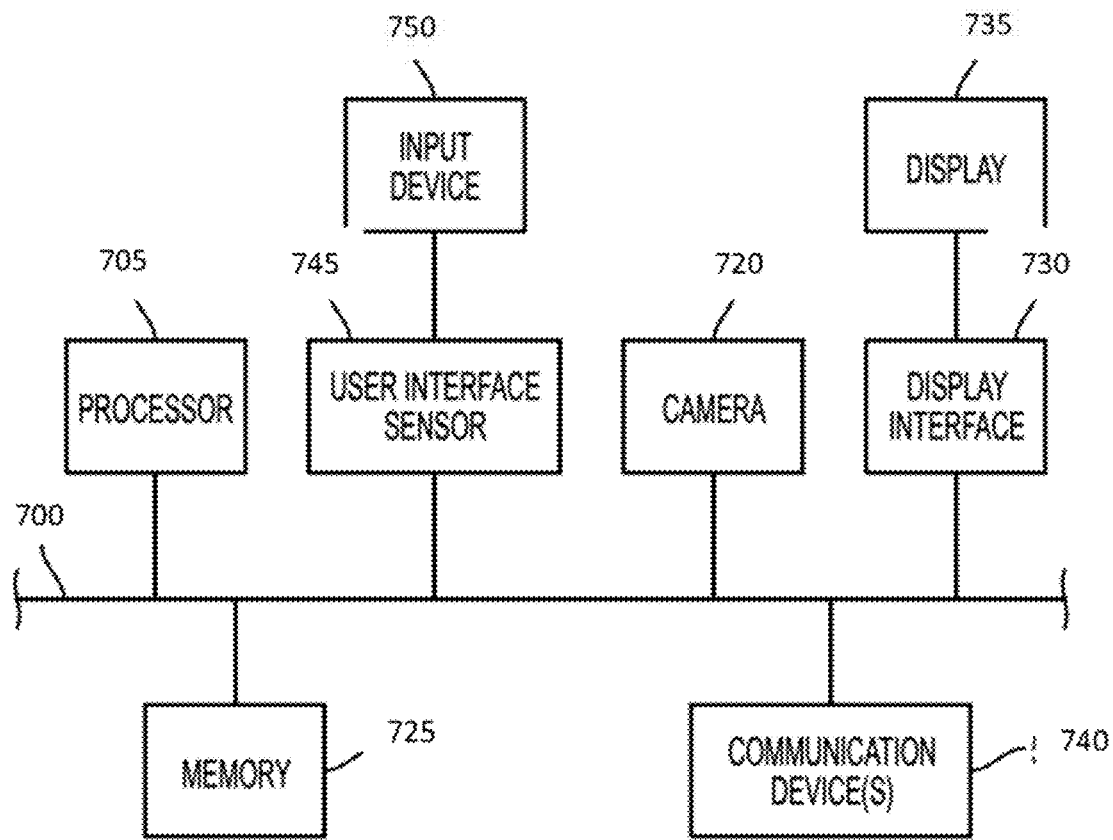
FIG. 7 depicts an example of internal hardware that may be used to contain or implement the various processes and systems as described in this disclosure.

FIG. 7 depicts an example of internal hardware that may be used to contain or implement the various processes and systems as discussed above that relate to a user interface and/or controller (for example, to automatically adjust the position of one or more secondary optics). An electrical bus 700 serves as an information highway interconnecting the other illustrated components of the hardware. A computing device will include one or more processors. CPU 705 is a central processing unit of the system, performing calculations and logic operations required to execute a program. CPU 705, alone or in conjunction with one or more of the other elements disclosed in FIG. 5, is a processing device, computing device or processor as such terms are used within this disclosure. As used in this document, the terms "processor" and "processing device" may include a single processor or a group of processors that collectively perform various steps of a process. Read only memory (ROM) 710 and random access memory (RAM) 715 constitute examples of memory devices. As used in this document, the terms "computer-readable medium," "memory" or "memory device" are used interchangeably and may include a single memory device, a group of memory devices, or a sector or other subdivision of such a device.

A controller 720 interfaces with one or more optional memory devices 725 that service as data storage facilities to the system bus 700. These memory devices 725 may include, for example, an external DVD drive or CD ROM drive, a hard drive, flash memory, a USB drive, a distributed storage medium such as a cloud-based architecture, or another type of device that serves as a data storage facility. As indicated previously, these various drives and controllers are optional devices. Additionally, the memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 710 and/or the RAM 715. Optionally, the program instructions may be stored on a tangible computer readable medium such as a compact disk, a digital disk, flash memory, a memory card, a USB drive, an optical disc storage medium, a distributed storage medium such as a cloud-based architecture, and/or other recording medium.

A display interface 730 may permit information from the bus 700 to be displayed on the display 735 in audio, visual, graphic or alphanumeric format. Communication with external devices may occur using various communication ports 740. A communication port 740 may be attached to a communications network, such as the Internet, a local area network or a cellular telephone data network.

The hardware may also include an interface 745 which allows for receipt of data from input devices such as a keyboard 750 or other input device 755 such as a remote control, a pointing device, a video input device and/or an audio input device.

The features and functions described above, as well as alternatives, may be combined into many other systems or applications. Various presently unforeseen or unanticipated alternatives, modifications, variations or improvements may be made by those skilled in the art, each of which is also intended to be encompassed by the disclosed embodiments.

The invention claimed is:

1. A luminaire comprising:
   a plurality of light emitting diode (LED) light sources including at least a first LED light source and second LED light source;
   a plurality of primary optics including at least a first primary optic and a second primary optic, wherein the first primary optic surrounds the first LED light source and is configured to reflect light generated by the first LED light source towards a target region, and wherein the second primary optic surrounds the second LED light source and is configured to reflect light generated by the second LED light source towards the target region; and
   a plurality of curved secondary optics including at least a first curved secondary optic and a second curved secondary optic, wherein the first curved secondary optic surrounds at least a portion of the first LED light source and is nested within an opening of the first primary optic, wherein the first curved secondary optic is configured to at least partially block light generated by the first LED light source from illuminating a region outside the target region, wherein the first curved secondary optic is an arc shaped visor that comprises at least one of the following: a reflective surface facing the first LED light source or a biased surface facing the first LED light source, and wherein the second curved secondary optic surrounds at least a portion of the second LED light source and is nested within an opening of the second primary optic, wherein the second curved secondary optic is configured to at least partially block light generated by the second LED light source from illuminating a region outside the target region.

2. The luminaire of claim 1, wherein:
   the first primary optic comprises a parabolic shaped reflector; and
   the first LED light source is positioned at a focus of the parabolic shaped reflector.

3. The luminaire of claim 2, wherein the first primary optic further comprises a visor attached to an outer periphery of the parabolic shaped reflector, the visor configured to further block the light generated by the first LED light source from illuminating the region outside the target region.

4. The luminaire of claim 1, wherein the first curved secondary optic is attached to the first primary optic via a pair of hinges that allow for adjustment of orientation of the first curved secondary optics.

5. The luminaire of claim 1, wherein the first curved secondary optic is attached to the first primary optic in an upper half portion.

6. The luminaire of claim 1, wherein the first curved secondary optic comprises optically reflective silicone.

7. The luminaire of claim 1, wherein one or more properties of the first curved secondary optic are configured based on a desired cut-off angle for at least partially blocking light generated by the first LED light source from illuminating the region outside the target region, wherein the one or more properties comprise at least the following: tilt, orientation, dimensions, relative position, biasing, reflectivity, size, or shape.

8. A lighting device comprising a plurality of light modules, wherein each of the plurality of light modules comprises:
a plurality of light emitting diode (LED) light sources including at least a first LED light source and second LED light source; and
an optical structure for controlling distribution of light generated by at least the first LED light source and the second LED light source, the optical structure comprising:
a plurality of primary optics including at least a first primary optic and a second primary optic, wherein the first primary optic surrounds the first LED light source and is configured to reflect light generated by the first LED light source towards a target region, and wherein the second primary optic surrounds the second LED light source and is configured to reflect light generated by the second LED light source towards the target region; and
a plurality of curved secondary optics including at least a first curved secondary optic and a second curved secondary optic, wherein the first curved secondary optic surrounds at least a portion of the first LED light source and is nested within an opening of the first primary optic, wherein the first curved secondary optic is configured to at least partially block light generated by the first LED light source from illuminating a region outside the target region, wherein the first curved secondary optic is an arc shaped visor that comprises at least one of the following: a reflective surface facing the first LED light source or a biased surface facing the first LED light source, and wherein the second curved secondary optic surrounds at least a portion of the second LED light source and is nested within an opening of the second primary optic, wherein the second curved secondary optic is configured to at least partially block light generated by the second LED light source from illuminating a region outside the target region.

9. The lighting device of claim 8, wherein:
the first primary optic comprises a parabolic shaped reflector; and
the first LED light source is positioned at a focus of the parabolic shaped reflector.

10. The lighting device of claim 9, wherein the first primary optic further comprises a visor attached to an outer periphery of the parabolic shaped reflector, the visor configured to further block the light generated by the first LED light source from illuminating the region outside the target region.

11. The lighting device of claim 8, wherein the first curved secondary optic is attached to the first primary optic via a pair of hinges that allow for adjustment of orientation of the first curved secondary optic.

12. The lighting device of claim 8, wherein the first curved secondary optic is attached to the first primary optic in an upper half portion.

13. The lighting device of claim 8, wherein the first curved secondary optic comprises optically reflective silicone.

14. The lighting device of claim 8, wherein one or more properties of the first curved secondary optic are configured based on a desired cut-off angle for at least partially blocking light generated by the first LED light source from illuminating the region outside the target region, wherein the one or more properties comprise at least the following: tilt, orientation, dimensions, relative position, size, or shape.

15. The lighting device of claim 8, wherein:
each of the plurality of LEDs light sources have a corresponding cut-off angle for at least partially blocking light generated by that LED light source from illuminating a corresponding region outside the target region.

16. A luminaire comprising:
a plurality of light emitting diode (LED) light sources including at least a first LED light source and second LED light source;
a plurality of primary optics including at least a first primary optic and a second primary optic, wherein the first primary optic surrounds the first LED light source and is configured to reflect light generated by the first LED light source towards a target region, and wherein the second primary optic surrounds the second LED light source and is configured to reflect light generated by the second LED light source towards the target region; and
a plurality of secondary optics including at least a first secondary optic and a second secondary optic, wherein the first secondary optic surrounds at least a portion of the first LED light source and is nested within an opening of the first primary optic, wherein the first secondary optic is configured to at least partially block light generated by the first LED light source from illuminating a region outside the target region, wherein the first secondary optic is an arc shaped visor that comprises at least one of the following: a reflective surface facing the first LED light source or a biased surface facing the first LED light source, and wherein the second secondary optic surrounds at least a portion of the second LED light source and is nested within an opening of the second primary optic, wherein the second secondary optic is configured to at least partially block light generated by the second LED light source from illuminating a region outside the target region.

* * * * *